United States Patent [19]
Holland

[11] Patent Number: 4,823,204
[45] Date of Patent: Apr. 18, 1989

[54] METHOD AND APPARATUS FOR FILM WEAVE CORRECTION

[75] Inventor: David E. Holland, Granada Hills, Calif.

[73] Assignee: Image Transform, North Hollywood, Calif.

[21] Appl. No.: 64,998

[22] Filed: Jun. 18, 1987

[51] Int. Cl.$^4$ ............................................... H04N 3/36
[52] U.S. Cl. ................................. 358/347; 358/214; 358/216
[58] Field of Search ............... 358/347, 345, 346, 214, 358/216, 348

[56] References Cited

U.S. PATENT DOCUMENTS 4,104,680 8/1978 Holland ............................... 358/347

Primary Examiner—Robert L. Richardson
Attorney, Agent, or Firm—Lyon & Lyon

[57] ABSTRACT

A method and apparatus for correction of both horizontal and vertical film weave is disclosed in connection with continuous motion type moving beam recorder or playback devices such as electron beam or laser beam recorders or flying spot scanner or line scan telecines. Weave correction is accomplished by scanning the sprocket hole of the film and generating a correction signal to compensate for the film weave. The film weave is corrected by electronic weave correction as opposed to mechanical pin registration means. The sprocket hole is scanned in the vertical direction to locate the upper and lower edges of the sprocket hole, and then to position the beam in the vertical center of the hole and for determination of vertical weave of the film. The sprocket hole is then scanned in the hozizontal direction, for determination of the horizontal weave of the film. In a film to tape transfer system the edge position of the sprocket hole is advantageously determined by comparing the actual detected signal with a fast peak detector signal set at 90% of the actual signal level. Provision is made for setting windows for acceptable weave corrections signals such that if the detected error exceeds the window, the previous weave correction signal which is within the window is used.

17 Claims, 6 Drawing Sheets

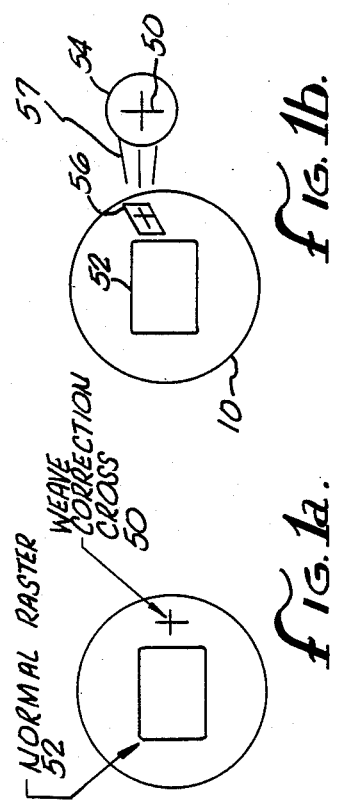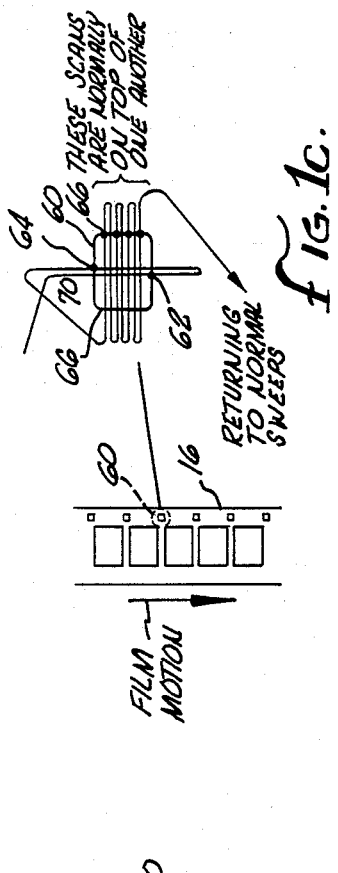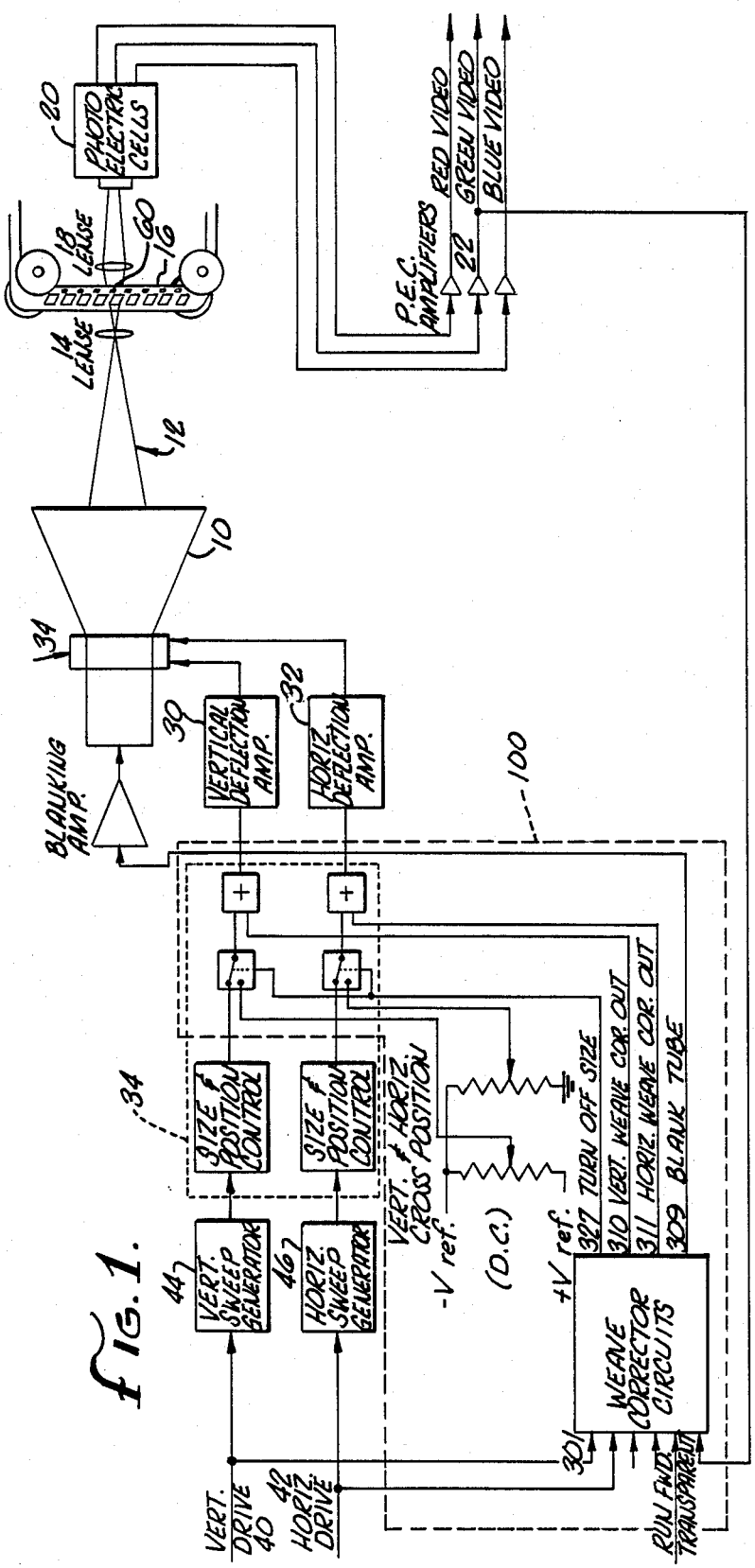

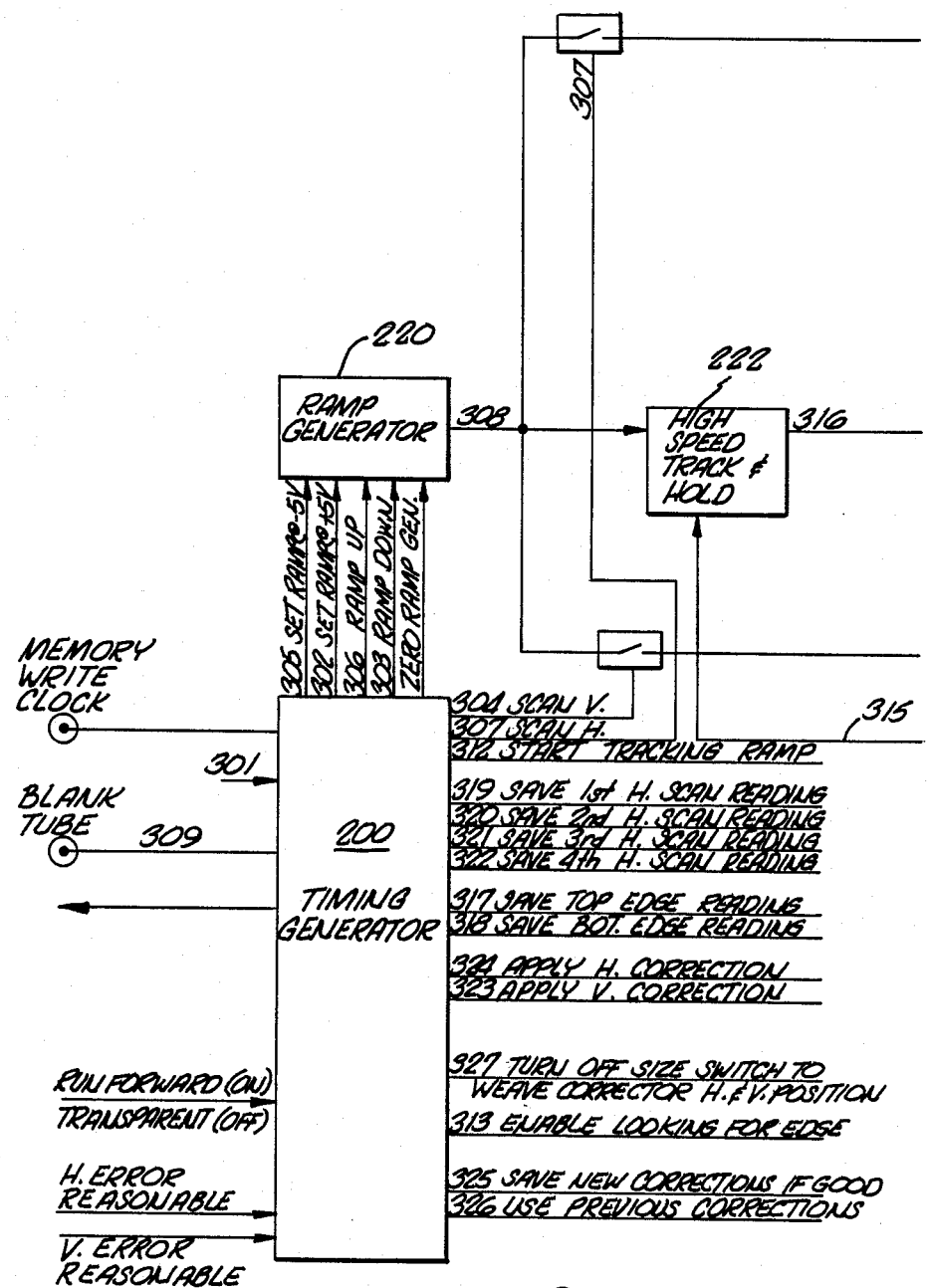
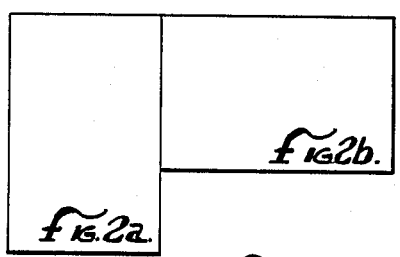
Fig. 2.

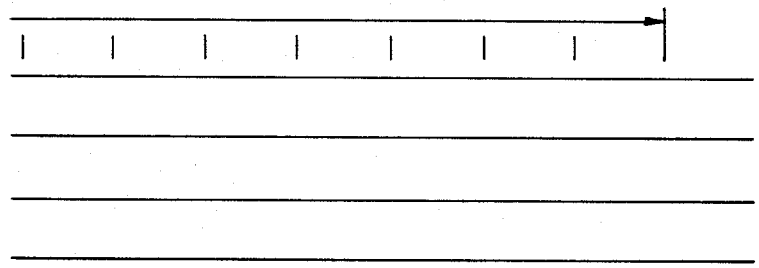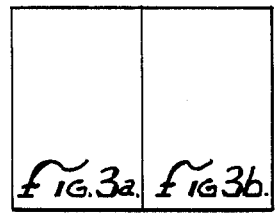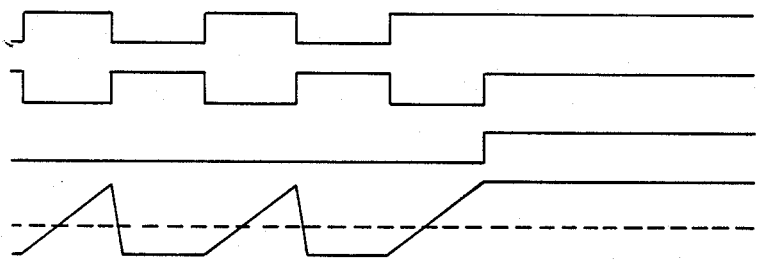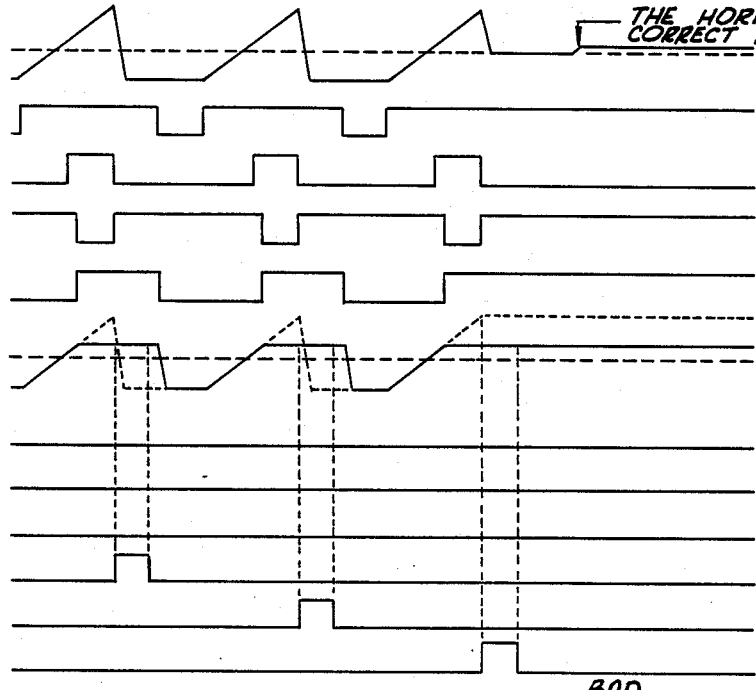
FIG. 3b.

METHOD AND APPARATUS FOR FILM WEAVE CORRECTION

FIELD OF THE INVENTION

This invention relates to an improved apparatus and method for film weave correction. More particularly, this invention relates to the correction of both vertical and horizontal weave of a picture caused by film weave in a continuous motion type moving beam recorder or playback device such as an electron beam or laser beam recorder or a flying spot scanner or line array telecine.

BACKGROUND OF THE INVENTION

Images may be stored in a variety of formats, including in a magnetic tape format for use in video and in a film format for use in projection. It is often desirable to change from one medium to the other medium. A variety of methods and machines exist for conducting such transfers. To convert from a tape to a film, a beam recorder is used wherein the electronic image stored in the magnetic video tape is converted to a signal in the form of an electron beam which is directed at electron sensitive film. The electron beam scans the film in a line-by-line fashion, generating an image on the film. To convert from a film to a tape a flying spot scanner or telecine is used. A source of light, as for example a laser beam or light from a phosphorous screen, scans the film in a raster or line-by-line fashion. The transmitted light is converted into an electrical signal through known means and stored on a video tape. In each of these types of transfers a continuous motion film drive is used to pull the film through the machine.

It has proved difficult to perform transfers in which the image maintains its reference to an original reference. This problem is particularly pronounced when the images are superimposed. For example, when a title is superimposed against a scenic background, the title may be seen to weave or jump in relationship to the background. This problem becomes more pronounced in high resolution processes or as the number of editing and compositing steps increases. The problem derives from the fact that the positional reference for the film and the tape is not the same. When a film is originally shot in a camera the image is mechanically registered relative to the sprocket holes. The tines of the sprocket engage the sprocket holes to register the film relative to the camera optics. Such a system is mechanically "pin registered". When this same film is transferred to video, as for example in a telecine, the film is no longer machine pin registered but is drawn through the machine by a continuous motion film drive. Mechanical pin registration cannot be used in a telecine operated in real time, at 24 or 30 frames per second, as there is insufficient vertical blanking time in the video system to allow pull down of the film between frames.

Because the film is edge guided during a transfer, film weave may be introduced if the edge of the film varies relative to the sprocket holes. In fact, the film edge tends to vary in distance from the sprocket holes due to manufacturing imperfections and tolerances in the film.

Various mechanical solutions have been attempted. One such solution added a mechanical sprocket drive to the continuous film drive at the point where the picture was scanned. This method introduced small but abrupt speed changes as the sprocket tines entered the sprocket hole. This caused random lines of the resultant video picture to separate during recording, which in turn caused unacceptable random horizontal black lines in the recorded picture. More recent attempted mechanical solutions have been directed to mechanical pin registration. Specifically, the film sprocket holes have been lowered onto stationary register pins by a stepping motor controlled by an auxiliary computer. The film is held steady by the pins during the transfer, and then the gate attachment is released to allow the film to advance. Because of the complicated mechanical nature of this attempted solution the transfer speeds are limited. The typical transfer rate through such a method is four frames per second, approximately six times slower than a real time transfer. Additionally, such mechanical pin registrations are unacceptable if a splice is covering a sprocket hole, or if the film stock has an odd sprocket hole size.

Other mechanical solutions attempted include the mechanical measurement of the position of the sprocket hole during the recording or reading of images on the film, and to use this position measurement to adjust the horizontal deflection of the beam. This method has been attempted without much success.

The problems of mechanical pin registration can be solved with electronic pin registration. As disclosed in U.S. Pat. No. 4,104,680, entitled "Method and Apparatus for Film Weave Correction", film weave may be eliminated in tape to film and film to tape transfers by electronically determining the position of the sprocket hole and positioning the resultant image relative to the sprocket hole. As discussed in the patent for the case of a tape to film transfer, the video signal is converted to an electronic beam, which is directed in a raster scan format to the electron sensitive film. Either the main beam or a secondary beam is used to electronically determine the location of the sprocket hole and to generate a weave correction signal, which in turn correctly positions the image on the film. The solution of electronic weave correction permits real time transfers.

While the electronic weave correction solution of the '680 patent applies equally to tape to film and film to tape transfers, some difficulties have been encountered in conducting transfers in certain instances. For example, when conducting a film to tape transfer in which a clear base stock film is used it has proved difficult to determine the edge position of the sprocket hole. If the film is clear there is little difference in the transmittance of light between the sprocket hole and the clear film. This problem did not arise in connection with tape to film transfers even with a clear or transparent film because the electron beam used in the film recording was stopped by the film. Another problem which has been generally encountered is the application of an erroneous correction signal which may be caused by the detection of a defect in the film or the detection of another object such as a dust particle.

SUMMARY OF THE INVENTION

In accordance with the present invention a scanning beam, typically an electron beam, or light or laser beam, is used to scan the position of the sprocket hole of the film. The beam used for the scanning of the images may be used to scan the position of the sprocket hole, or a separate beam may be used for this purpose. The scanning beam is caused to sweep the sprocket hole first in a vertical direction to locate the position of the top and bottom of the sprocket hole. The beam is then positioned in the vertical center of the sprocket hole. Horizontal sweeps of the scanning beam, preferably a number of times, are then done to determine the position of the horizontal edges of the sprocket hole. This is advantageously done in the vertical center of the sprocket hole since some sprocket holes have sides which are not parallel. Random vertical positioning of the beam in the sprocket hole may not result in the generation of a true weave correction signal. As a result of the determination of the sprocket hole, a film weave correction signal may be generated for both the horizontal and vertical position of the image.

In accordance with this invention, the position of the edge of the sprocket hole is determined by monitoring the actual detected signal level and by comparing it with a fast peak detection signal which is at some level, preferably at 90 percent, of the actual signal level. The fast peak detection signal level tracks the actual signal level, excluding very quick fluctuations of the actual signal level. The actual signal tends to vary quicker than the fast peak detector signal. When the detector beam passes the sprocket hole edge there is a rapid momentary drop off in transmitted light intensity. This drop off is due to the light scattering properties of the film edge. Thus, when the actual detected signal momentarily drops, if the fast peak detection signal is set sufficiently close to the actual detection level, the actual detected signal level will momentarily drop below the 90 percent of the fast peak detection signal level. In this way, the edge of the sprocket hole may be detected even if a clear film base or leader is used.

It often occurs that a weave correction signal is generated which does not in fact represent weave of an image. Such an error may occur if the sprocket hole is damaged or misshapen, or if a foreign object on the film, such as dust or dirt, is detected as being a sprocket hole edge. In order to avoid applying a weave correction signal to an image when in fact no weave is present, various windows, that is, user defined criteria, are applied to eliminate erroneous weave correction signals. For example, gating circuitry is applied such that an edge detection signal can be detected only at times when it would be expected to occur. Additionally, if the ultimate weave correction signal falls outside of the window limits set by the operator that new weave correction signal is rejected and the last weave correction signal which fell within the accepted window limits is applied to the image. In this way, spurious corrections are substantially eliminated.

Thus, a principal object of the present invention is to provide an improved weave correction system.

An additional object is to provide an electronic weave correction system which accurately corrects for both horizontal and vertical film weave.

Another object of this invention is to more accurately determine the horizontal film weave by positioning the detecting beam in the vertical center of the sprocket hole, such that errors due to vertical capstan servo drift, film shrinkage and/or the curved sides of the sprocket holes in certain film will not affect the weave correction signal It is a further object of this invention to determine the edge of a sprocket hole by a comparison of the actual signal level to a reference signal level, the reference signal level preferably being approximately 90 percent of the actual signal level excluding rapid variations of the actual signal level.

A further object of the present invention is to eliminate spurious weave correction signals such that the weave correction signal applied represents actual film weave.

These and other objects and advantages of the present invention will become more clear upon reference to the accompanying drawings and the following detailed description:

BRIEF DESCRIPTION OF THE DRAWINGS

FIG. 1 is a block and schematic diagram of the weave correction system providing for horizontal and vertical weave correction.

FIG. 1A is an end on view of a single cathode ray tube (CRT) showing the normal raster and a weave corrector cross pattern.

FIG. 1B is an end on view of a single CRT showing the normal raster scan and another CRT showing a weave corrector cross pattern, plus optics.

FIG. 1C is a detailed drawing of a sprocket hole and the preferred scanning pattern.

DETAILED DESCRIPTION

Figure 2B:
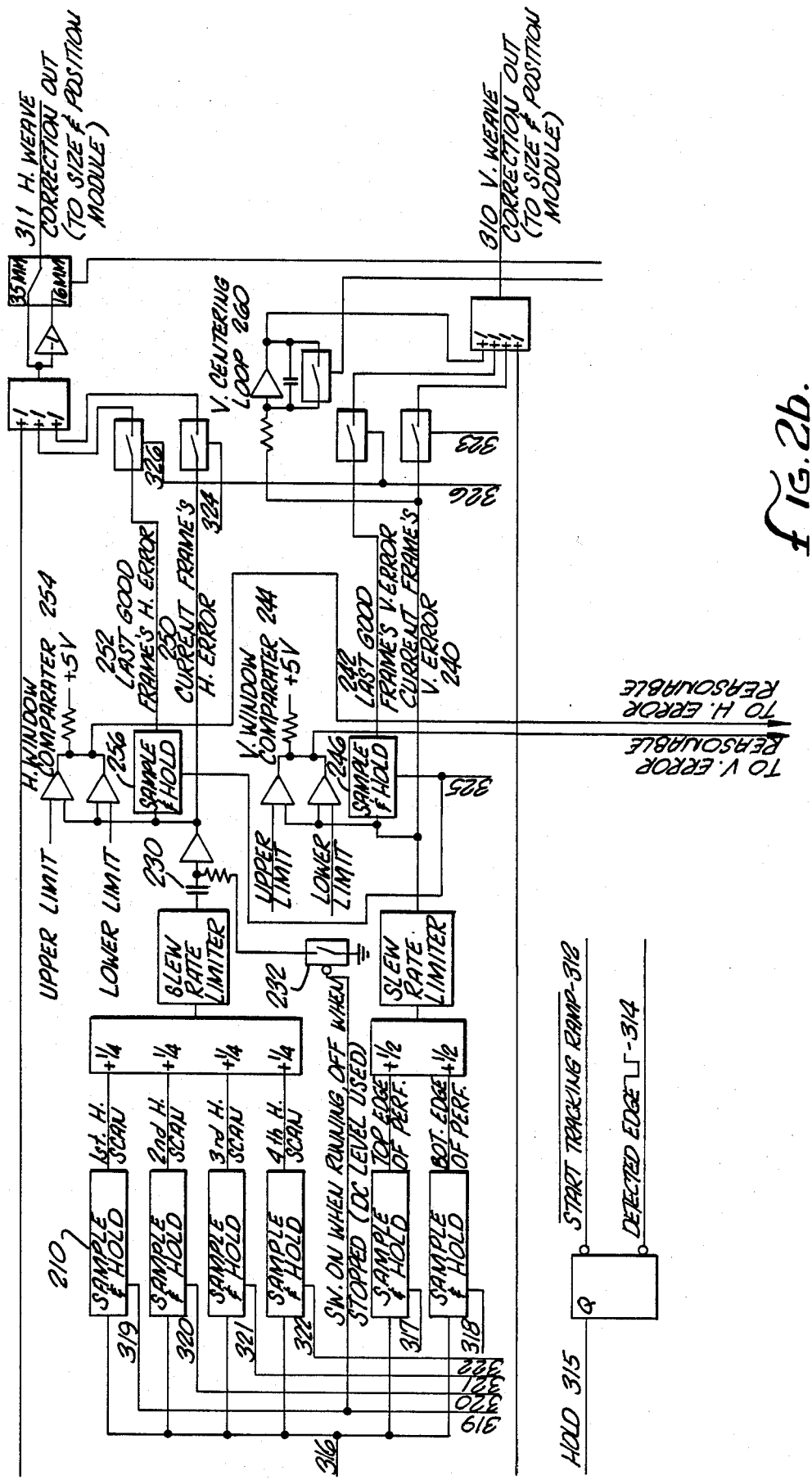
FIGS. 2(a) and (2(b) are block and schematic diagrams of the weave correction circuit FIGS. 3(a) and 3(b) are timing diagrams for the weave correction circuit.

The present invention relates to methods and apparatus for film weave correction in transfers using continuous motion film drive systems. The inventions described and disclosed herein are equally usable for both tape to film and film to tape transfers. However, the difficulties in detecting the sprocket hole edge in film to tape systems are more pronounced when clear film, that is, one that is highly transmissive to light, is encountered. Therefore, the discussion herein will focus on conventional film to tape systems which would be likely to encounter clear film base at some point in a transfer.

Film to tape transfers are conducted by scanning film, typically 35 mm or 16 mm movie film, by a light source. Such transfers are typically conducted through use of a telecine which supplies light from a cathode ray tube (CRT). It should be appreciated that the light source may be other than a CRT, for example, a laser light source. A readily available telecine of the type which could be used in connection with this invention is a Mark III telecine manufactured and sold by Rank Cintel. Most of the modifications which must be made to the Rank telecine consist of the addition of the circuits which are disclosed herein. In addition, it is typically necessary to modify the film gate of the Rank telecine such that the sprocket hole area of the film may be scanned. In an unmodified Rank telecine scanning occurs only of the film image area and not of the sprocket hole area. Therefore, a hole or slot must be machined into the film guide to permit the detecting beam to scan the sprocket hole. Additionally, it may be necessary to supply significantly higher power deflection amplifiers for the rapid deflection of the beam to the sprocket hole area. The need for such amplifiers can be avoided if a separate detecting beam is used as discussed below.

FIG. 1 is a diagram of the weave corrector for the correction of film weave in a continuous motion flying spot scanner telecine, for example, in a Rank telecine. In operation, a CRT 10 emits a beam of light 12 which passes through optics 14, film 16, and further optics 18. The transmitted light is incident upon photo electric cells (PEC) 20 which provide a red video, green video 22, and blue video output signal. The output of CRT 10 is controlled by vertical deflection amplifier 30 and horizontal deflection amplifier 32 which control the deflection yoke 34 in a conventional manner. The vertical deflection amplifier 30 and horizontal deflector amplifier 32 are in turn controlled by the weave correction circuitry 100 and the size and position control circuitry 34. Vertical drive input signal 40 and horizontal input signal 42 are fed respectively to vertical sweep generator 44 and horizontal sweep generator 46. The weave correction circuitry 100 generates a horizontal weave correction signal and vertical weave correction signal. The specifics of the weave correction circuit 100 will be discussed in detail below.

FIG. 1A shows the face of a conventional CRT as would be found in a Rank telecine. The rectangular area constitutes the normal raster scan 52 of the telecine. The raster scan 52 is the line-by-line scan of the film image which will generate the video signal. Also shown on the face of the CRT is a weave corrector cross 50. The weave correction circuitry disclosed herein generates the weave corrector cross 50. The weave corrector cross 50 generates the detector beam which will be used to determine the location of the sprocket hole 60. The weave corrector cross 50 shown in FIG. 1A is generated by the same CRT 10 which generates the normal raster scan 52. However, it will be appreciated that a second CRT could be used to generate the weave corrector cross. FIG. 1B shows an arrangement of two CRTs. CRT 10 generates the normal raster scan 52 while CRT 54 generates the weave corrector cross 50. Suitable optics, as for example a mirror 56, direct the weave corrector cross 50 from CRT 54 towards the optics 14 and the film 16, ultimately towards the photo electric cells 20.

FIG. 1C shows the film 16 and sprocket hole 60 in detail. The detector beam 70 may be either the beam 12 from the CRT 10 or a separate beam 57 from the CRT 54. The basic operation of the weave detector is the same with either embodiment. The detector beam 70 will scan the sprocket hole 60. Typically, the weave corrector will use the time during the vertical blanking interval to scan the sprocket hole 60. During the vertical blanking time, the image on film 16 is not being scanned so that the detector beam 70 can be the same beam 12 which is used to scan the film 16. During this time, the weave corrector generates two vertical ramps, one negative going and one positive going in order to locate the top edge 6 and bottom edge 64 of the sprocket hole. After the vertical center of the sprocket hole 60 has been determined the detector beam 70 sweeps horizontally at the level of the vertical center to detect the edges 66 of the sprocket hole 60. Preferably, a number of horizontal scans are conducted, typically four. If multiple scans are done the measurements are averaged together in an attempt to more accurately measure the sprocket hole 60 position. The horizontal sweeps of the scanning beam 70 sweep repeatedly along virtually the same track in the shape of a cross. The drawing in FIG. 1C has been expanded so that the motion of the detector beam 70 can be seen over time.

In actual operation, the horizontal and vertical scans would be located on top of each other if realistically depicted in FIG. 1C.

The initial two vertical sweeps used to measure the top position of the sprocket hole 62 and the bottom position of the sprocket hole 64 are done at a fixed horizontal position. The film 16 moves relatively little in the horizontal direction during this time period. It is unlikely that the hole would move far enough horizontally for the two vertical sweeps to miss the sprocket hole 60. Additionally, the top and bottom of all sprocket holes are straight so that small changes in the horizontal position of the film 16 would not affect the vertical sprocket hole measurements. However, in measuring the horizontal position of the sprocket hole 60 it is preferable to correct the vertical weave of the film prior to determining the horizontal weave. In some continuous motion telecine machines the amount of vertical weave is often greater than the horizontal weave. This is because the capstan that is pulling the film through the gate is a relatively large distance from the film gate. Dimensional problems in the film, for example, film shrinkage, tend to be magnified and may show up as vertical film weave. In addition, the capstan servo may drift or may be slow to recover from disturbances such as those caused by film splices traveling through the gate area. Additionally, it is often the case that the left and right sides of certain 35 mm film sprocket holes are circular rather than straight. Accordingly, if the vertical weave is not corrected when the horizontal measurements are made the vertical weave would cause the horizontal measurements to be mad at different positions along the circular side of the hole. This would cause the horizontal measurements to introduce an erroneous weave correction signal caused by the vertical film weave. By measuring the horizontal locations of the sprocket hole 60 after the vertical weave correction signal has been determined and applied, these problems may be avoided.

Figure 3A:
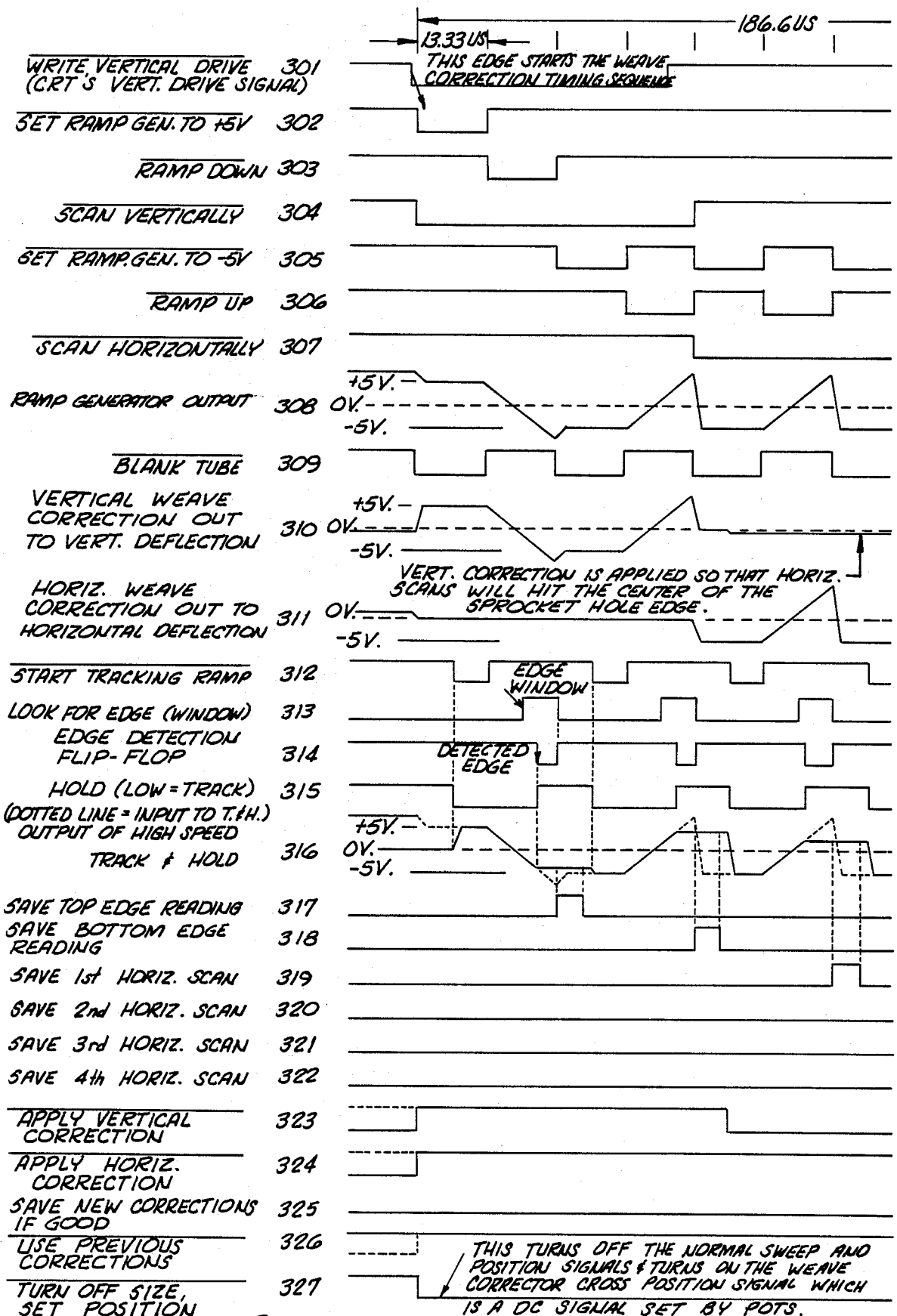

FIG. 2 shows the weave correction circuitry 100. FIG. 3 shows the timing diagrams which correspond to the weave correction circuitry shown in FIG. 2. Together, FIG. 2 and FIG. 3 provide a detailed description of the weave correction circuit 100. All of the signals shown of FIG. 3 have been numbered in the 300s for convenience. The weave correction circuitry 100 is under the control of timing generator 200 which generates a variety of signals shown as outputs from the timing generator 200. Certain of these signals drive a ramp generator 220 or a high speed track and hold circuit 222. Yet other of these signals control the various gating and error window features which serve to reduce the possibility of an erroneous weave correction signal.

Referring to FIG. 2, the operation of the weave correction circuit 100 is controlled by a timing generator 200. While the timing generator signals may be generated in a number of ways known to the art they are advantageously generated through use of a single integrated circuit, as for example, an erasable programmable logic device (EPLD). A suitable EPLD is the EP 1800 made by Altera Corp. This single integrated circuit may be programed to take the place of a large number of logic integrated circuits. The EP 1800 is programed through conventional techniques known to those skilled in the art. The circuit may, of course, be generated through discrete devices.

Referring to FIGS. 2 and 3, weave correction is initiated by a write vertical drive signal 301 which starts the timing generator 200. At this point, a turn off size, set position signal 327 becomes active and takes control of the scanning beam 12 away from the normal telecine sweep circuitry. A scan vertically signal 304 causes the weave corrector's internal ramp generator output waveform 308 to output through the vert. weave correction out 310 output. A set ramp gen to plus five V signal 302 causes the ramp generator to slew to and then stay at plus five V so that it will be ready to make the first vertical sweep of the sprocket hole 60. A blank tube signal 309 blanks the beam 12 while the beam is being positioned so that a bright spot does not appear on the CRT where the beam is parked waiting for the measurement sweeps to occur.

Several signals become inactive at this time. The Apply Vertical Correction 323, Apply Horizontal Correction 324, and Use Previous Corrections 326 become inactive. This removes previous weave correction signals so that the vertical measurements can take place.

Next a start tracking ramp signal 312 becomes active. This causes a hold signal 315 to go low thus placing the high speed track and hold into the track mode. The track and hold slews to match the ramp generator which is still parked at +5 V. Next a set ramp gen. to +5 V signal 302 is deactivated and then a ramp down signal 303 is activated. This causes the ramp generator 220 to start ramping downward from +5 V at a rate of 1 volt per micro second. This rate was picked for simplicity as it is an easy number to work with, and it produced a beam writing speed close to that used when scanning in the normal raster scan 52. This writing speed is preferred but not essential.

While the detector beam 70 is moving vertically a look for edge signal 313 becomes active approximately half way through the negative ramp. This releases an edge detection flip flop 364 (FIG. 4) so that it can now react to a pulse from the edge comparator 360. Any pulse detected at this time would be an indication that a sprocket hole edge has just been passed. The look for edge signal 313 is timed to go high when the beam is expected to be approximately in the center of the sprocket hole. This helps to ensure that the weave correction circuit 100 will not see the upper edge 62 of the sprocket hole as the beam enters the sprocket hole 60. By use of such gating circuitry the detection of spurious events and erroneous detection of film weave may be significantly reduced. Generally, in telecine applications in which a sprocket hole edge is to be detected it is desirable to begin looking for an edge while the detection beam 70 is within the sprocket hole 60 and to scan through the edge and onto the film 16. In this way, spurious events may be even further reduced. If the detector beam 70 (FIG. 1) were to scan from the film 16 into the sprocket hole 60, dirt or imperfections in the film 16 might be detected as if they were the sprocket hole edge. An erroneous weave correction signal might therefore result. It should be noted that for an electron beam recorder the opposite is true. That is, since the film is opaque to the electron beam which serves to scan for the sprocket hole it is best to scan from the film 16 and into the sprocket hole 60 since this will produce the best pulse edge from the electron beam detector situated on the opposite side of the film.

Returning to FIGS. 2 and 3, when the upper edge 62 of the sprocket hole 60 (FIG. 1) is detected a hold signal 315 is set high. This causes a high speed track and hold signal 316 to go into the hold mode. The voltage which is held in the high speed track and hold, signal 316, is that voltage which is required to deflect the beam to the edge whose position is being measured. A save top edge reading signal 317 occurs. This causes a sample and hold circuit 210 to save the voltage being held by the high speed track and hold 316 since it is about to be placed back into the track mode to prepare for the next vertical measurement scan to be done in the upward direction. There are as many sample and hold circuits 210 connected to the high speed track and hold circuit 222 as there are edge locations to be stored. In the preferred embodiment there are six sample and hold circuits 210. Two to store the vertical sprocket hole edge measurements and four to store the horizontal sprocket hole edge measurements. After the position of the upper edge 62 of the sprocket hole has been determined the ramp generator is set to 5 V by a signal set ramp gen. to negative 5 V 305 and the high speed track and hold 222 is set back to tracking the ramp generator by the signal start tracking ramp 312. A ramp up signal 306 becomes active and the ramp generator starts to ramp up in a positive direction at +1 volt per micro second. Again, the choice of ramp speed is left up to the discretion of the circuit designer. After the lower edge is detected, a save bottom edge reading pulse 318 saves this reading in its respective sample and hold circuit 210. I order to conduct the horizontal scans a scan vertically signal 304 is deactivated and the signal scan horizontally 307 is activated so that the ramp generator will dive the horizontal deflection. The vertical weave correction previously determined is sent out the vert. weave correction out 310 output. In this way the horizontal scanning is conducted in the vertical center of the sprocket hole 60. (FIG. 1) Each of the four horizontal scans will go through the same sequence used for the vertical scans of first setting the ramp generator to −5 V, placing the high speed track and hold signal 316 in the track mode, causing the ramp generator 220 to ramp upward at +1 volt per microsecond in order to scan the edge, placing the high speed track and hold signal 316 in the hold mode when the edge is detected, and finally saving the held voltage in the corresponding sample and hold circuit 210 with the pulse save first horiz. scan 319. These steps are repeated for the second through fourth horizontal scans 320 through 322.

The four horizontal readings are averaged and then A.C. coupled with a large capacitor 230 to the rest of the circuitry. This signal is A.C. coupled so that the weave corrector circuit 100 does not provide any horizontal offset of its own. The weave corrector circuit 100 will remove horizontal weave but will not try to compensate for the film being off center in the gate.

A switch 232 connects the capacitor 230 to ground through a resistor whenever the weave corrector is operating and disconnects it whenever the weave corrector is not operating. This is done so that the voltage on the coupling capacitor 230 will change as little as possible while the weave corrector circuit 100 is not operating. When the weave corrector circuit 100 starts running again, the capacitor 230 will not have to be charged up if the weave corrector has not been off for a long period. The capacitor should already be close to the correct voltage. If steps are not taken to ensure that the capacitor is near the correct voltage the capacitor will charge up over a period of a few seconds causing the picture to perceptively shift horizontally very slowly. When the picture finally stops shifting, the picture's horizontal position is identical to that it would have had if the weave corrector were shut off.

After both the vertical and horizontal error measurements have been completed, the signal turn off size, set position signal 327 is de-activated, causing the normal sweeps to start and the weave correction cross position voltages to be removed.

Now that the error signals for both the horizontal and the vertical directions have been obtained it is desirable to determine whether those error signals should be applied to correct the next picture frame to be scanned. If an error has been made in measuring the sprocket hole position, application of that signal to the film image would cause a positional error if it were to be applied. Such an error could arise if dirt was detected or some defect in the sprocket hole edge existed. If the error in measuring the hole position is large, the weave corrector would actually cause a large positional error if it were to use incorrect measurement.

Accordingly, to prevent the weave corrector from introducing a large error due to an incorrect measurement, window comparators 244 and 254 are used to determine whether the error signal is unacceptably large. If the error signal is outside of the window comparator range it is assumed that the signal is erroneous. In this event the weave correction circuitry will use the last weave correction signal which was within the acceptable error window limits. As shown in FIG. 2 two window comparators are used, a vertical window comparator 244 and a horizontal window comparator 254. The window comparators are set such as the largest weave error that would be expected is the maximum error permitted. Weave error larger than the window limits is assumed to indicate a mistake in measurement and accordingly the weave corrector circuit 100 would not try to correct for it. The error limits are typically rather small. If the limits are kept small the worse that can happen is that the weave corrector circuit 100 will in effect turn off for large errors. This ensures that the resultant picture will not weave any worse than it would have without the weave corrector.

Referring to FIGS. 2 and 3, the selection of weave correction signal is as follows. After the save forth horiz. scan pulse 322, the apply vertical correction signal 323 is deactivated. Next, the timing generator 200 examines the output of each of the two window comparators. If either window comparator indicates an error that is excessive, the timing generator 200 will cause a use previous corrections signal 326 to be activated. This will cause the two error signals called last good frames vert error 242 and last good frames horiz. error 252 to be used to correct the weave for the next picture frame. If the error is not excessive the timing generator 200 will instead cause the signals apply vertical correction 32 and apply horizontal correction 324 to become active thus causing the current frame's error signals to be used to weave correct the next picture frame. Additionally, the timing generator 200 will generate the pulse save new corrections if good 325 which causes two sample and hold circuits 246 and 256 to save the current frame's error signals for use later if the weave error becomes excessive.

Unlike the horizontal weave correction signal 250 the vertical weave correction signal 240 is not A.C. coupled. The vertical weave needs to be corrected to an absolute position. The telecine's capstan servo does not always position the film perfectly since different film may have different amounts of shrinkage. Shrinkage means that the film has to run at a slightly different velocity through the gate which in turn causes a slight phase error which translates into the picture being slightly misframed vertically. Additionally, the film sprocket that is used by the film phasing servo has undersized tines and therefore can introduce a slight phase error due to the film sliding up or down on the sprocket tines.

Because the vertical weave correction signal is D.C. coupled it is possible that a D.C. offset voltage may be generated over time. Such a D.C. offset may cause the weave corrector cross 50 to be positioned towards either extreme of its operating range. This problem is avoided through the use of the vert. centering loop circuit 260. A circuit includes an integrator that is looking at the current frame's vert. error signal 240. If the error is not zero, the integrator's output will slowly add a vertical offset of its own until the average value of the current frame's vertical error signal 240 approaches zero. This circuit has the effect of automatically vertically centering the weave corrector cross 50 (FIG. 1) on the sprocket hole 60 so that the full vertical operative range of the weave corrector circuitry is used.

The weave correction circuitry 100 disclosed here may be used in connection with any film containing sprocket holes. Typically, it is used in connection with 35 mm or 16 mm film. When 35 mm film is scanned the inner edge of the sprocket hole 60 is scanned for. When using 16 mm film, the outer edge of the sprocket hole 60 is scanned for. Accordingly, provision is made for inverting the polarity of the Horiz. Weave Correction Out output 311 of the weave corrector circuit 100 for 16 mm film. Inverting the signals causes the sprocket hole 60 to be scanned the other direction for 16 mm film so the opposite edge is measured. Since scanning in the reverse direction also inverts the polarity of the error signal that will be produced, it is necessary to invert the horizontal error signal prior to applying that signal to the weave correction of the picture.

Figure 4:
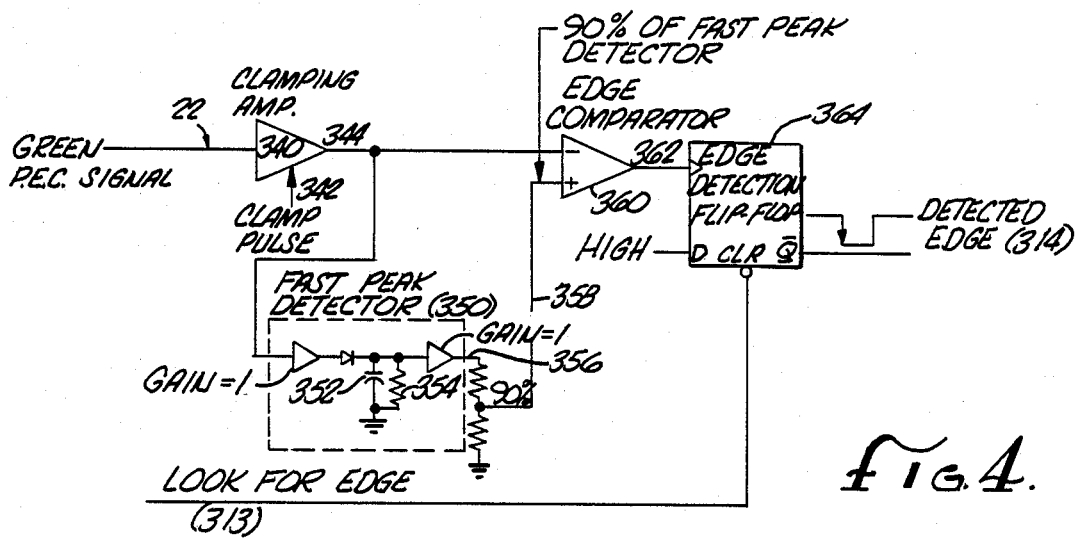
FIG. 4 is a circuit diagram for the edge detection circuitry.

FIG. 4 shows a simplified version of the edge detector circuitry. It is of course extremely important that the edge of the sprocket hole 60 be detected. If the film is relatively opaque in comparison to the sprocket hole edge detection presents minimal problems. However, if the amount of light transmitted through the film is approximately the same as the light transmitted through the sprocket hole, detection becomes much more difficult. Detection of the edge of the sprocket hole, even with clear film base or clear leader, can be accomplished through the following edge detector circuitry.

The output of the green photoelectric cell 22 is used for edge detection because it produces a signal with the least electronic noise, in comparison with the red or blue PECs. Additionally, the green PEC produces the signal with the greatest contrast on negative film, which has an orange base. The green PEC signal 22 is fed to a clamping amplifier 340 where its level is boosted somewhat so that a fast peak detector 350 and edge comparator 360 which follow can operate at a greater signal level. In this way, signal to noise ratio performance is improved somewhat. Additionally, the clamping amplifier D.C. restores the green PEC signal 22 so that a level of zero volts indicates zero light. This is done by providing a clamp pulse 42 to the clamping amp 340 during each horizontal retrace period of the beam when the beam is normally blanked. The presence of the clamp pulse 342 causes the clamping amplifier 340 to provide a D.C. offset to the green PEC signal 22 such that the output signal from the clamping amplifier 340 will be at zero volts when the clamp pulse 342 is present. This is a conventional clamping amplifier whose structure and operation are known to those skilled in the art.

The clamped signal 344 is fed to the fast peak detector circuit 350. The purpose of the fast peak detector 350 is to measure the amount of light detected so that the edge comparator 360 that follows will have some reference to determine when an edge crossing has occurred. The word "fast" in fast peak detector refers to the fast discharge of the peak detector holding capacitor 352. A resistor 354 is placed across the holding capacitor 352 such that the capacitor will not hold the peak value for long. This allows the peak detector circuit 350 to follow the rapid drop off in light which occurs as the weave corrector cross 50 nears the edge of the optical path of the telecine. This is especially important for 16 mm film transfers where the relatively small size of the telecine optics require detection of the sprocket holes at the outer limits of the optics.

When the detector beam 70 crosses a sprocket hole edge 60 the green PEC signal 22 will rapidly drop off momentarily at the time the scanning beam 70 crosses the sprocket hole edge. It is believed that this drop off is due to the light scattering properties of the sprocket hole edge. On clear film this scattering effect becomes very important as there is very little difference in the density of the film and the sprocket hole to be detected.

Figure 5:
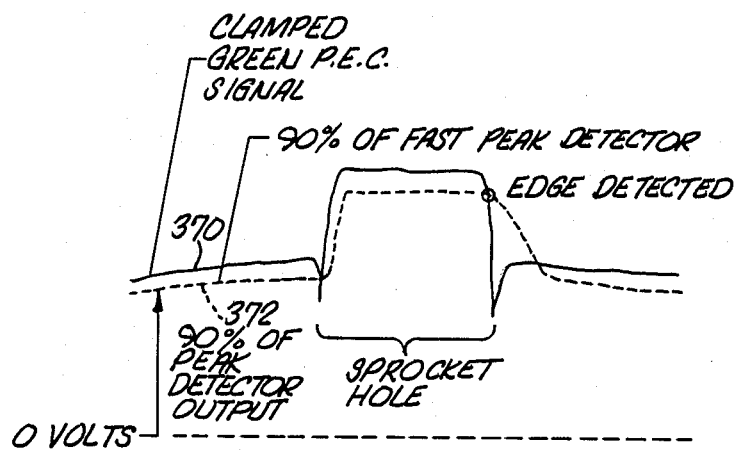
FIG. 5 shows the actual detailed signal and the fast peak detector signal for a typical sprocket hole signal for a vertical scan on non-clear edge film.

The edge comparator 360 is a standard comparator integrated circuit which is used to compare the clamped green PEC signal 344 with 90% of the peak detected light value signal 356. The value of 90% has proved to be effective for the particular machine disclosed herein, however, this number may be changed given the particular construction and design of other machines. FIG. 5 shows a plot of the clamped green PEC signal 22 (FIG. 1) along with the 90% of fast peak detector signal 358 (FIG. 4) for a typical sprocket hole signal for a vertical scan on non-clear edge film, such as color negative film. The sprocket hole 60 (FIG. 1) can be seen in the middle. The edges of the film cause light scattering, resulting in a darker appearance in comparison with the sprocket hole 60 of the film 16. The dash line 372 indicates the 90% of the fast peak detector output level. The comparator indicates whether or not the dotted line 372 is above or below the solid line 370. The edge comparator output 362 going high is an indication that a sprocket hole edge has been crossed by the detector beam 70. The timing generator 200 produces the signal Look For Edge 313 which is timed to go high at the approximate center of the sprocket hole during the vertical scans. When this signal is high the positive going output of the edge comparator 362 causes the edge detection flip flop to fall.

Figure 6:
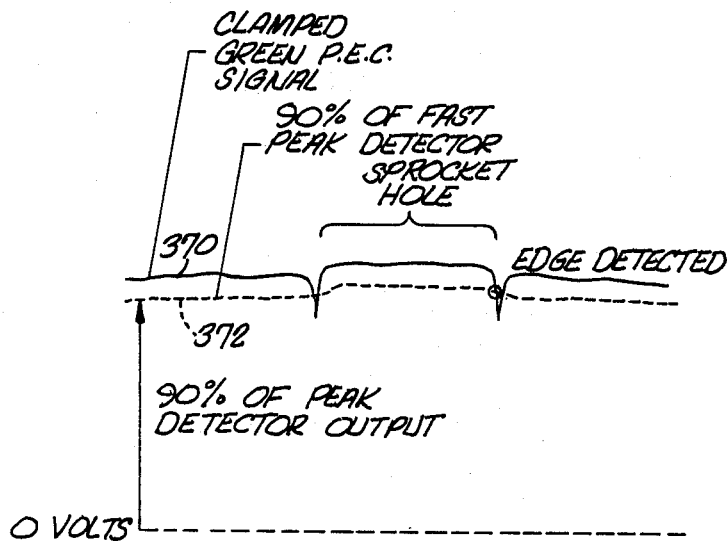
FIG. 6 shows the actual detected signal and the fast peak detector signal for a typical sprocket hole for a vertical scan on clear edged film.

FIG. 6 shows the clamped green PEC signal 370 and the 90% of fast peak detector signal 372 for a typical sprocket hole signal for a vertical scan on clear edged film. There is little difference between the amount of light passing through the sprocket hole and the amount of light passing through the film. The sprocket hole edge can be detected because the clamped green PEC signal 370 momentarily drops below the 90% of peak detector output signal 372. Again, gating is used such that the proper edge of the sprocket hole is detected and spurious event detection is kept to a minimum.

While the above discussion has been with reference to a conventional telecine such as the Rank Mark III telecine, the invention disclosed herein may be used with any image transfer device which uses a continuous motion film drive. For example, weave correction may be accomplished in accordance with this invention in connection with a charge coupled device (CCD) line array telecine. In such a telecine there is no scanning beam used. Rather the film is illuminated through a slit of light and the image of this slit is focused onto a CCD line array sensor. By arranging the CCD array such that the sprocket hole edge falls onto this array, or upon another CCD array, the information derived from this signal may be processed in accordance with this invention to produce both the horizontal and vertical weave correction signals. These error signals can then be used during the scanning of the next picture frame to adjust the time during which a line is sensed by the CCD array. In this way, vertical weave correction could be accomplished. Horizontal weave correction can be achieved by shifting the output of the CCD array sufficiently to compensate for the horizontal weave error signal.

Though the invention has been described with respect to specific preferred embodiments thereof, many variations and modifications will become apparent to those skilled in the art. It is therefore the intention that the appended claims be interpreted as broadly as possible in view of the prior art to include all such variations and modifications.

What is claimed is:

1. A method for detecting the position of a sprocket hole in a film recording or reproducing apparatus which employs a continuous motion film drive comprising the steps of causing the scanning beam to scan the sprocket hole in a vertical direction to detect a vertical edge of the sprocket hole, positioning the scanning beam within the sprocket hole based on the detection of a vertical edge, and causing the scanning beam to scan the sprocket hole in a horizontal direction.

2. A method for detecting the position of sprocket hole in a film recording or reproducing apparatus which employs a continuous motion film drive comprising the steps of causing the scanning beam to scan the sprocket hole in a vertical direction to detect a first vertical edge of the sprocket hole, causing the scanning beam to scan the sprocket hole in a vertical direction to detect a second vertical edge of the sprocket hole, positioning the scanning beam within the sprocket hole based on the detection of a vertical edge, and causing the scanning beam to scan the sprocket hole in a horizontal direction.

3. The method of claim 2 wherein the scanning beam is positioned in the vertical center of the sprocket hole based on the detection of the first vertical edge and second vertical edge of the sprocket hole.

4. The method of claim 2 where the scanning of the sprocket hole in the horizontal direction is performed a plurality of times.

5. The method of claim 2 where the scanning of the sprocket hole in the horizontal direction is done four times.

6. An apparatus for determining the position of a sprocket hole in a film recording or reproducing apparatus which employs a continuous motion film drive comprising a source of a scanning beam for scanning the sprocket hole, a scanning beam for scanning at least the sprocket hole, means to divert the scanning beam to sweep in a vertical direction to detect at least a vertical edge of the sprocket hole, means to position the scanning beam in the sprocket hole, means to divert the scanning beam to sweep in a horizontal direction to detect a horizontal edge of the sprocket hole.

7. An apparatus for determining the position of a sprocket hole in a film recording or reproducing apparatus which employs a continuous motion film drive comprising a source of a scanning beam for scanning the sprocket hole, a scanning beam for scanning at least the sprocket holes;

means to divert the scanning beam to sweep in a vertical direction to detect upper and lower vertical edges of the sprocket hole, means to position the scanning beam in the center of the sprocket hole, and means to divert the scanning beam to sweep in a horizontal direction to detect a horizontal edge of the sprocket 8. The apparatus of claim 7 wherein the source of the scanning beam is a cathode ray tube.

9. The apparatus of claim 7 further comprising a source of a scanning beam for scanning the film in a raster scan fashion.

10. The apparatus of claim 9 wherein the source of the scanning beam for scanning the sprocket hole and the source of a scanning beam for scanning the film in a raster scan fashion comprise the cathode ray tube.

11. The apparatus of claim 9 wherein the source of the scanning beam for scanning the sprocket hole and the source of a scanning beam for scanning the film in a raster scan fashion are separate cathode ray tubes.

12. A method of detecting the edge of a sprocket hole in a film recording or reproducing apparatus which employs a continuous motion film drive, in which a scanning beam scans the film and sprocket hole, and a detector which measures the intensity of the transmitted beam, comprising the steps of detecting the level of the transmitted beam, generating a reference signal from the level of the transmitted beam which reference signal is less than the level of the transmitted beam, comparing the level of the transmitted beam with the reference signal, and indicating a crossing of the scanning beam with the sprocket hole edge when the transmitted beam is equal to or less than the reference signal.

13. The method of claim 12 wherein the reference signal is approximately 90% of the level of the transmitted beam.

14. A apparatus for detecting the crossing of a detector beam with the edge of a sprocket hole in a film recording or reproducing apparatus which employs a continuous motion film drive including electronic means comprising a clamping amplifier, a fast peak detector, means to reduce the signal from the fast peak detector, and a comparator for comparing the output of the clamping amplifier and the signal from the fast peak detector as reduced.

15. The apparatus of claim 14 wherein the fast peak detector comprises:

an operational amplifier, a diode and capacitor combination to detect the peak voltage, a resistor to quickly discharge the capacitor, a second operational amplifier.

16. A method for reducing error in application of a weave correction signal in film recording or reproducing apparatus which employs a continuous motion film drive for film containing frames comprising defining a window of acceptable weave correction signals, comparing the weave correction signal for the current film frame with a comparator, applying the weave correction signal for a current film frame if the weave correction signal is within the window of acceptable weave correction signals, and applying the last weave correction signal which was within the window of acceptable weave correction signals if the weave correction signal for the current film frame is not within the window of acceptable weave correction signals.

17. An apparatus for elimination of horizontal and vertical film weave in a film reproduction apparatus which detects the position of the sprocket hole of the film by sensing transmission of light through the film to generate a current weave correction signal comprising a scanning beam in the form of a weave corrector cross, a detector for said scanning beam, an edge detector comprising a fast peak detector, and a comparator for comparing the output of the fast peak detector and said detector, means for defining a window of acceptable weave correction signals, means to apply the current weave correction signal if it is within the window of acceptable weave correction signals, and means to apply the last weave correction signal which was within said window if the current weave correction signal is not within said window.

* * * * *